A. J. MORROW.
WAREHOUSE TRUCK.
APPLICATION FILED SEPT. 18, 1920.
1,428,248.
Patented Sept. 5, 1922.
2 SHEETS—SHEET 1.
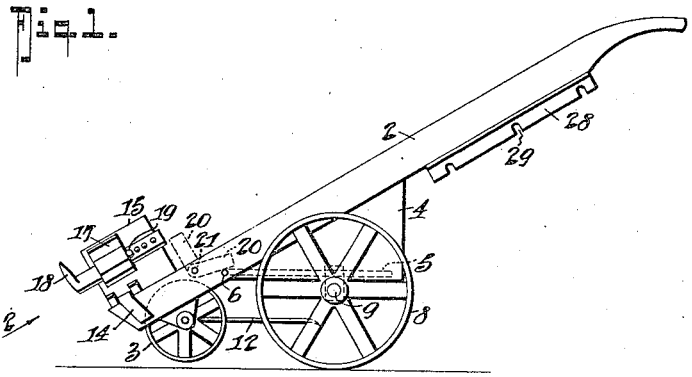
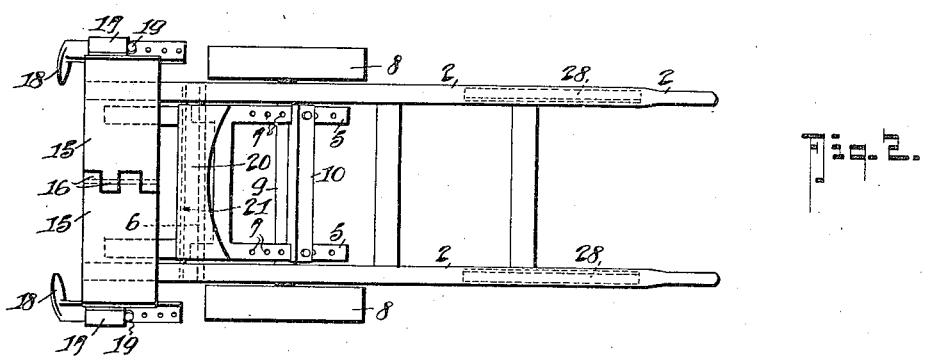
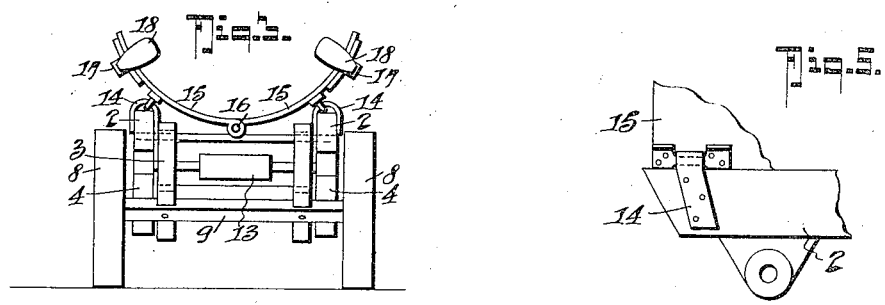
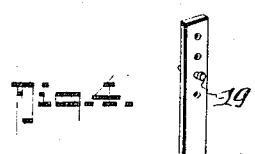
Inventor
Alfred J. Morrow.
By Fred G Dieterich
Attorneys A. J. MORROW.
WAREHOUSE TRUCK.
APPLICATION FILED SEPT. 18, 1920.
1,428,248.
Patented Sept. 5, 1922.
2 SHEETS—SHEET 2.
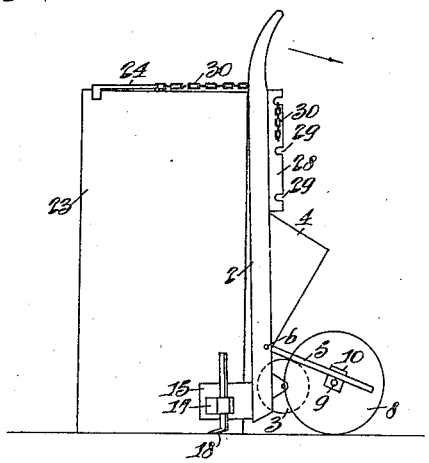
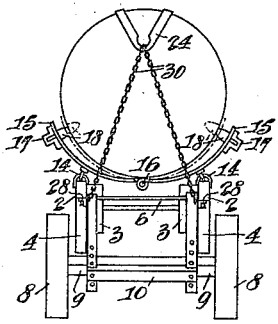
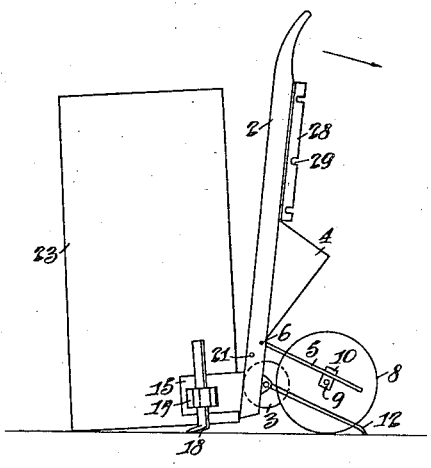
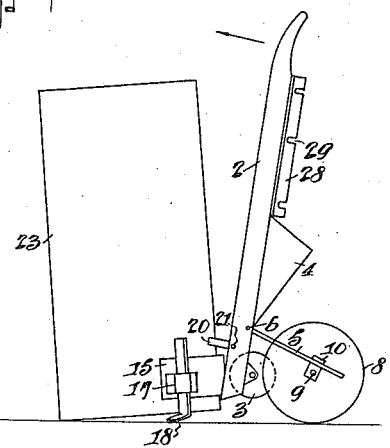
Inventor
Alfred J. Morrow.
Attorneys Patented Sept. 5, 1922.

1,428,248

UNITED STATES PATENT OFFICE.

ALFRED J. MORROW, OF SEATTLE, WASHINGTON.

WAREHOUSE TRUCK.

Application filed September 18, 1920. Serial No. 411,081.

*To all whom it may concern:*

Be it known that I, ALFRED J. MORROW, a citizen of the Dominion of Canada, residing at Seattle, in the county of King and State of Washington, have invented certain new and useful Improvements in Warehouse Trucks, of which the following is a specification.

This invention relates to a warehouse truck which has been particularly designed to facilitate the transference of cylindrical parcels of goods, such as rolls of paper.

The invention is particularly described in the following specification, reference being made to the drawings by which it is accompanied, in which:

Fig. 1 is a side elevation of the truck in the carrying position.

Fig. 2 is a plan of the truck.

Fig. is an end elevation looking in the direction of the arrow 2 in Fig. 1.

Fig. 4 is an enlarged perspective view of one of the load lifting toes of the truck.

Fig. 5 is an enlarged detail of the hinge connection of the load bearing member of the truck to the truck frame.

Fig. 6 is a side elevation showing the application of a truck to effect the lifting of a load.

Fig. 7, a plan of the same, and

Figs. 8 and 9 show in side elevation two successive positions of the truck in depositing the load from the truck.

In these drawings 2 represents the side frames of the truck which are formed as handles at one end and at the other end are carried on a pair of relatively small wheels 3 within the width of the side frames 2.

Adjacent the wheels 3 and beneath the side frames 2 a pair of substantially right angled blocks 4 are secured, the lower edges of which are approximately paralled to the ground line when the truck is in the normal carrying position as shown in Fig. 1.

Pivotally connected at 6, between the side frames 2, adjacent the front end of the block 4, is an open frame 5, to the underside of the side members of which an axle 9 is adjustably secured, each end of which axle projects beyond the side frames 2 of the truck and is provided with a load carrying wheel 8.

Across the upper side of the frame 5, parallel to the axle, a bar 10 is notched onto the side frames and secured to the axle, so that the axle and its bar are movable on the sides of the frame 5 to and from the pivot 6 and may be retained in any desired position by pins or bolts through holes 7 of the frames 5 which register with corresponding holes through the axle 9 and its bar 10.

On the axle of the leading wheels 3 a floor engaging spur member 12 is mounted and counterbalanced by a weight 13 on the other side of the axle, the preponderating weight of 13 maintaining a spur clear of the ground and normally in a horizontal position.

On the lower end of the side frames 2 is hinge-connected at 14 an arcuate member 15 of metal plate, the curvature of which corresponds approximately to that of the usual paper roll. This member 15 is preferably in two parts hinged together at 16 in the middle line of the truck and the hinge connection at 14 is a shown in Fig. 5, such as will permit movement at the hinge 16, the reason for which will be explained later.

Slidably mounted in a bearing 17 secured to the underside of each end of the arcuate member 15 is a toe member 18, the toe end of which is radially directed to the centre of the arc of 15. Outward movement of these members 18 is adjustably limited by a pin 19 through apertures spaced apart in the end of the member further from the toe.

To facilitate withdrawal of the toe projection 18 from beneath a load, when depositing the same, a block 20 having an arcuate upper edge is pivotally mounted at 21 in the side frames 2, and is counterweighted to normally assume a position between the side frames and below their upper edges, as shown in dotted lines in Fig. 1, and in full lines in Fig. 2, but may be upturned to the position shown by the dot and. dash lines in Fig. 1, and in full lines in Fig. 9, when required for use.

When upturned into contact with a load on the truck, this member 20 forms a fulcrum enabling the toe members 18 to be withdrawn as the handles of the truck are pushed toward the load, as indicated by the arrow 27 in Fig. 9.

On the underside of each side frame 2 adjacent the handle end is secured an angle iron 28, the downwardly projecting edge of which is notched as at 29 to receive the links of a chain 30 connected to a double ended grab hook 24 by which the upper end of the load is connected to the handled end of the truck as shown in Figs. 6 and 7.

In use, the truck is moved up against a roll 23 standing on its end and the truck is upended on the toes 18 until the smaller leading wheels are clear of the ground and with the upper end of the truck frame 2 in contact with the roll. The larger load bearing wheels 8 being secured on the frame 5, which is hinged at 6, to the side frames 2 of the truck, will remain on the ground when the truck frame is upended, as shown in Fig. 6.

The double hook 24 is then passed over the further end of the upper edge of the roll 23 and the chains 30 connected thereto are shortened and connected to the handle end of the truck in the notches 29 of the members 28. The handle end of the truck is then pulled down as indicated by the arrow 25, and the roll is pulled over with it until the smaller wheels 3 are in contact with the ground when the leading end of the truck will roll on those wheels and the toe members 18 will pass under the canted lower end of the roll, as represented by the dot and dash lines in Figure 7.

It will be noticed that while the truck is upended the toes 18 being in contact with the roll before they are passed under it, the arcuate member 15 is bent back on its hinge 16, as represented by the full lines in Fig. 6, and the inward movement on the wheels 3 and the bearing of the roll against the articulation 16 causes the toes to move under the canted lower end of the roll. The truck frame with the upper end of the roll connected is then pulled down by the handles to the position represented in Fig. 1 with the smaller wheels 3 off the ground, the weight being carried by the larger and wider spaced wheels 8.

As the truck is drawn down the weight of the roll resting on the toes 18 draws said toes outward until the limit of their endwise movement is attained against the limiting stops 19, which limit is adjustable according to the length of the roll in order to give an effective balance of a load on the truck.

The truck is then moved with the load to the desired place of deposit, which the ample size of the wheels 8 and the balance of the load must facilitate. On arriving at the place of deposit, the truck is upended, as shown in Fig. 8, in which upending movement and as with the loading movement, the leading smaller wheels greatly assist. The chains of the bifurcated hook 24 are released from their connection to the truck, the spur 12 is pressed by the foot of the operator into holding engagement with the floor and by pulling on the handles of the truck in the direction of the arrow 26 the roll is pushed forward into its desired position.

The spur is then released from engagement with the floor and assumes its normal position, and when the member 20 is pushed forward to the position shown in Fig. 9 and the handles pressed toward the roll, as indicated by the arrow 27, the toes are readily withdrawn from beneath the roll which retains the position in which it has been placed on the floor.

Having now particularly described my invention, I hereby declare that what I claim as new and desire to be protected in by Letters Patent, is:

1. A warehouse truck, comprising in combination a handled frame mounted on wheels adjacent the handles, an arcuate member of sheet metal connected at each end to the side frames of the truck adjacent the wheels, toe members endwise movable adjacent each end of the arcuate member, and means limiting endwise outward movement of the toe members.

2. A warehouse truck, comprising in combination, a handled frame mounted on wheels adjacent the end opposite the handles, an arcuate member made in two parts hinge-connected together in the medial line of the truck, each part being connected to a side frame of the truck adjacent the wheels, toe members slidably mounted on the underside of each end of the arcuate member, and means limiting endwise movement outward of each toe member.

3. A warehouse truck, comprising in combination, a handled frame mounted on wheels adjacent the end opposite to the handles, an arcuate member of sheet metal connected at each end to the side frames of the truck adjacent the wheels, toe members radially directed inward and endwise movable on the underside of the arcuate member, and adjustable means limiting endwise outward movement of the toe members.

4. A warehouse truck, comprising in combination, a handled frame mounted on wheels adjacent the end opposite the handles and having a toe projection from the wheeled end of the truck frame, a member extending across between the side frames adjacent the toe projection and pivotally mounted on the side frames to fold down clear of their upper side or project upward into contact with the load on the truck.

5. A warehouse truck having a handled frame having wheels under the end opposite the handles and a toe projection from the wheeled end of the frame, a member pivotally mounted to the truck frame intermediate the toe and the handles and adjacent the toe, which member is counterweighted to normally maintain a position beneath the upper edges of the side frames but susceptible of being moved on its pivot into contact with a load on the truck.

6. A warehouse truck, comprising in combination, a handled frame mounted on wheels under the end opposite the handles, a toe member outwardly projecting from that end of the frame, a bifurcated grab hook chain-connected to each side member of the truck adjacent its handles, and means in the chain connection to each handle for lengthening or shortening the chain connection to the handle.

In testimony whereof I affix my signature.

ALFRED J. MORROW.